(12) United States Patent
Lee et al.

(10) Patent No.: US 10,615,651 B2
(45) Date of Patent: Apr. 7, 2020

(54) INTERIOR PERMANENT MAGNET TYPE ROTOR, PERMANENT MAGNET TYPE MOTOR HAVING THE INTERIOR PERMANENT MAGNET TYPE ROTOR, AND COMPRESSOR HAVING THE PERMANENT MAGNET TYPE MOTOR

(71) Applicant: LG ELECTRONICS INC., Seoul (KR)

(72) Inventors: Wonyong Lee, Seoul (KR); Jeonghwan Kim, Seoul (KR); Soohyun Park, Seoul (KR); Jihyun Ahn, Seoul (KR); Injae Lee, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 303 days.

(21) Appl. No.: 15/612,654

(22) Filed: Jun. 2, 2017

(65) Prior Publication Data

US 2018/0269732 A1  Sep. 20, 2018

(30) Foreign Application Priority Data

Mar. 16, 2017 (KR) .................. 10-2017-0033199

(51) Int. Cl.
*H02K 1/27* (2006.01)

(52) U.S. Cl.
CPC ......... *H02K 1/276* (2013.01); *H02K 2201/06* (2013.01); *H02K 2213/03* (2013.01)

(58) Field of Classification Search
CPC ...... H02K 1/276; H02K 1/2753; H02K 1/274; H02K 1/272; H02K 1/2706; H02K 1/27; H02K 2201/06

USPC .......................... 310/156.38, 156.53, 156.47
See application file for complete search history.

(56) References Cited

U.S. PATENT DOCUMENTS

| | | | | |
|---|---|---|---|---|
| 7,667,364 B2* | 2/2010 | Niguchi | ................. | H02K 1/278 |
| | | | | 310/156.47 |
| 8,796,896 B2* | 8/2014 | Lau | ........................ | H02K 1/148 |
| | | | | 310/156.12 |
| 9,762,096 B2* | 9/2017 | Oketani | ................. | H02K 1/276 |

FOREIGN PATENT DOCUMENTS

| | | | | |
|---|---|---|---|---|
| CN | 1848614 | A | 10/2006 | |
| CN | 102386724 | A | 3/2012 | |
| CN | 203193417 | U | 9/2013 | |
| CN | 103516080 | A | 1/2014 | |
| EP | 0445308 | A1 | 9/1991 | |
| JP | 56101367 | A * | 8/1981 | ............. H02K 1/276 |
| JP | 01206859 | A * | 8/1989 | |
| JP | 03117338 | A * | 5/1991 | ............. H02K 1/278 |

(Continued)

*Primary Examiner* — Jeremy A Luks
(74) *Attorney, Agent, or Firm* — Dentons US LLP

(57) ABSTRACT

An interior permanent magnet type rotor includes: a rotor core having a plurality of slots formed therein, the plurality of slots having a symmetric longitudinal sectional shape; and a plurality of permanent magnets respectively inserted into the plurality of slots, the plurality of permanent magnets having an asymmetric longitudinal sectional shape, wherein each of the plurality of permanent magnets includes: a top surface part; a bottom surface part formed opposite to the top surface part; and first and second side surface parts connecting the top surface part and the bottom surface part, wherein a first vertical part and a second vertical part, which are in contact with side surface parts of the slot, are formed in the first and second side surface parts, respectively.

17 Claims, 5 Drawing Sheets

(56) References Cited

FOREIGN PATENT DOCUMENTS

JP        10-174324 A     6/1998
JP       2006340556 A   12/2006

* cited by examiner

INTERIOR PERMANENT MAGNET TYPE ROTOR, PERMANENT MAGNET TYPE MOTOR HAVING THE INTERIOR PERMANENT MAGNET TYPE ROTOR, AND COMPRESSOR HAVING THE PERMANENT MAGNET TYPE MOTOR

CROSS-REFERENCE TO RELATED APPLICATIONS

The present application claims the benefits of priority to Korean Patent Application No. 10-2017-0033199 filed on Mar. 16, 2017, which is herein incorporated by reference in its entirety.

BACKGROUND

The present disclosure relates to an interior permanent magnet type rotor, a permanent magnet type motor having the interior permanent magnet type rotor, and a compressor having the permanent magnet type motor.

Since a permanent magnet type motor uses a permanent magnet instead of a coil for a rotor, it is unnecessary to supply power to the coil. Thus, the permanent magnet type motor has high efficiency, and its maintenance cost is reduced as its operation time becomes longer. Accordingly, the permanent magnet type motor has recently come into the spotlight.

The permanent magnet type motor may be classified into an interior permanent magnet type motor and a surface permanent magnet type motor.

The interior permanent magnet type motor is a motor of a type in which a permanent magnet is embedded in a rotor, and the surface permanent magnet type motor is a motor of a type in which a permanent magnet is attached to an outer circumferential surface of a rotor.

As a design for increasing a motor speed is performed so as to design a high-output and high-efficiency motor having a small size, the surface permanent magnet type motor has recently been replaced by the interior permanent magnet type motor.

The interior permanent magnet type motor has the following advantages as compared with the surface permanent magnet type motor.

First, since a permanent magnet is embedded in a rotor core, an adhesive force of the permanent magnet, which overcomes a centrifugal force and a maximum torque, can be guaranteed. Thus, the interior permanent magnet type motor is strong and advantageous in high-speed rotation.

Second, a magnetic torque and a reluctance torque are available together, and thus a high torque can be realized.

Third, the external diameter of a rotor is elaborately processed, and thus a gap can be reduced.

Fourth, the loss of eddy current on a rotor surface is reduced, and thus high efficiency can be realized.

Fifth, the range of operating speed can theoretically approach to infinity through weak field control, and thus the interior permanent magnet type motor is advantageous in high-speed rotation.

However, as compared with the surface permanent magnet type motor, the interior permanent magnet type motor using the reluctance has a large cogging torque due to characteristics of the rotor, and therefore, a large noise is generated in an operation of the interior permanent magnet type motor.

In particular, when the permanent magnet embedded in the rotor has a shape symmetrical with respect to a vertical axis or a horizontal axis, e.g., a rectangular shape, the interior permanent magnet type motor has a cogging torque larger than that of a motor in which a skewed magnet is embedded, and therefore, a large noise is generated.

In order to solve such a problem, there has been proposed a motor in which a skewed magnet inclined in a parallelogram shape is applied to a rotor core (see Prior Art).

However, the prior art has a problem as follows.

In detail, a slot into which a magnet is inserted has a rectangular shape that is symmetric laterally and vertically, and the magnet inserted into the slot has a skewed shape, i.e., a parallelogram shape.

Therefore, after the magnet is inserted into the slot, there occurs a phenomenon that the magnet vibrates or shakes in the slot. In order to prevent such a vibration or shaking phenomenon, when a skewed main magnet is inserted in a slot, a sub-magnet for filling in a gap is inserted into the slot together with the skewed main magnet such that the slot is completely filled. Therefore, the manufacturing cost of the motor increases, and the manufacturing process of the motor is complicated.

Prior Art: Japanese Patent Laid-open Publication No. 1988-174324 (Jun. 26, 1998)

SUMMARY

In one embodiment, an interior permanent magnet type rotor includes: a rotor core having a plurality of slots formed therein, the plurality of slots having a symmetric longitudinal sectional shape; and a plurality of permanent magnets respectively inserted into the plurality of slots, the plurality of permanent magnets having an asymmetric longitudinal sectional shape, wherein each of the plurality of permanent magnets includes: a top surface part; a bottom surface part formed opposite to the top surface part; and first and second side surface parts connecting the top surface part and the bottom surface part, wherein a first vertical part and a second vertical part, which are in contact with side surface parts of the slot, are formed in the first and second side surface parts, respectively.

In another embodiment, a permanent magnet type motor includes: a stator; and the interior permanent magnet type rotor rotatably disposed at the inside of the stator.

The interior permanent magnet type rotor and the permanent magnet type motor having the same according to the present disclosure have advantageous effects as follows.

In detail, left and right surfaces of the permanent magnet are formed as vertical surfaces, and the vertical surface is adhered closely to a side surface of the slot, so that the permanent magnet is prevent from shaking in the slot when the rotor rotates in a state in which the permanent magnet is inserted into the slot.

In addition, it is unnecessary to additionally insert a separate sub-magnet so as to prevent the permanent magnet from shaking in the slot, so that manufacturing cost can be reduced and a manufacturing process can be simplified.

In addition, the permanent magnet is formed in a shape asymmetric with respect to horizontal and vertical axes, so that cogging torque and total harmonic distortion (THD) (a ratio of the other harmonic waves with respect to fundamental frequency components) can be decreased as compared with the typical interior permanent magnet type motor in which a symmetrical permanent magnet is inserted.

Specifically, as a skewed permanent magnet (or a permanent magnet having a skewed shape) is applied, flux is smoothly changed when the rotor rotates. Thus, the cogging torque can be decreased to 80% and the THD can be decreased to 44%, as compared with a symmetrical permanent magnet such as a rectangular permanent magnet.

In addition, it is unnecessary to change the shape of a slot formed in the rotor core or change an angle at which core plates constituting the rotor core are stacked. Thus, manufacturing cost can be remarkably reduced, and a change in vibration characteristic of the core plate can be minimized.

In addition, the permanent magnet can be changed in various asymmetric shapes without changing the shape of the slot of the rotor core, so that the number of models of developable motors can be increased. As a result, investment cost for each motor or compressor model can be minimized.

In addition, it is unnecessary to allow a plurality of permanent magnets to be adhered to one another or be injection-molded, and it is possible to overcome a problem in that the permanent magnet is easily broken.

DETAILED DESCRIPTION OF THE EMBODIMENTS

Hereinafter, an interior permanent magnet type rotor according to an embodiment will be described in detail with reference to the accompanying drawings.

Figure 1:
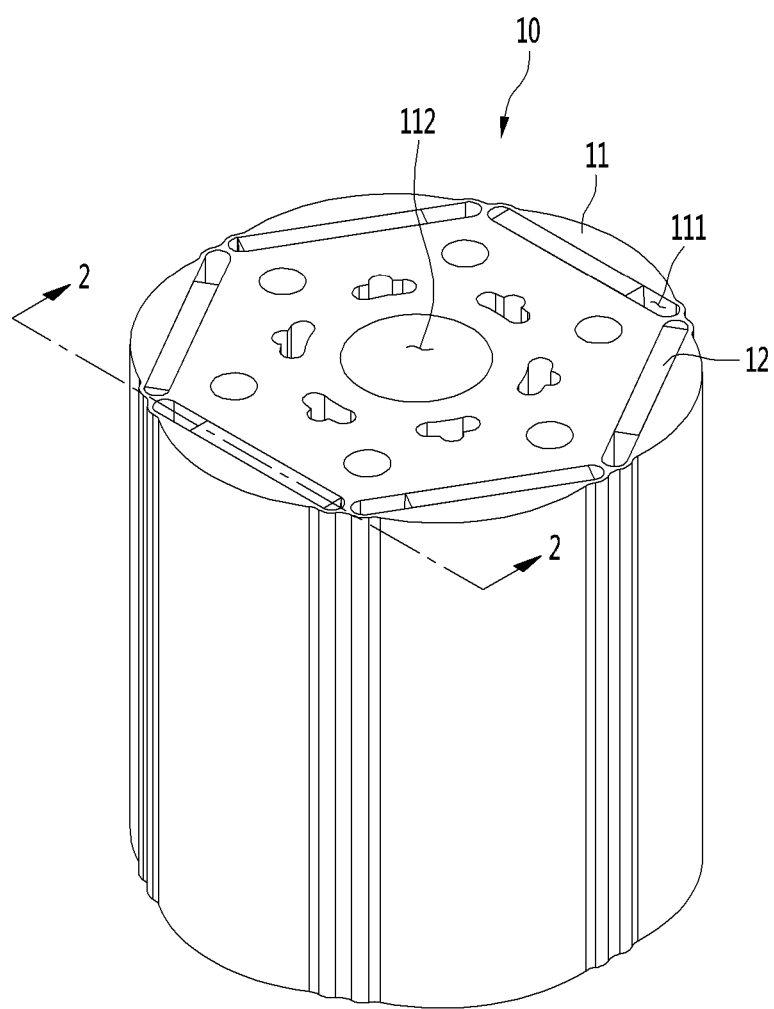
FIG. 1 is a perspective view of an interior permanent magnet type rotor according to an embodiment.
Figure 2:
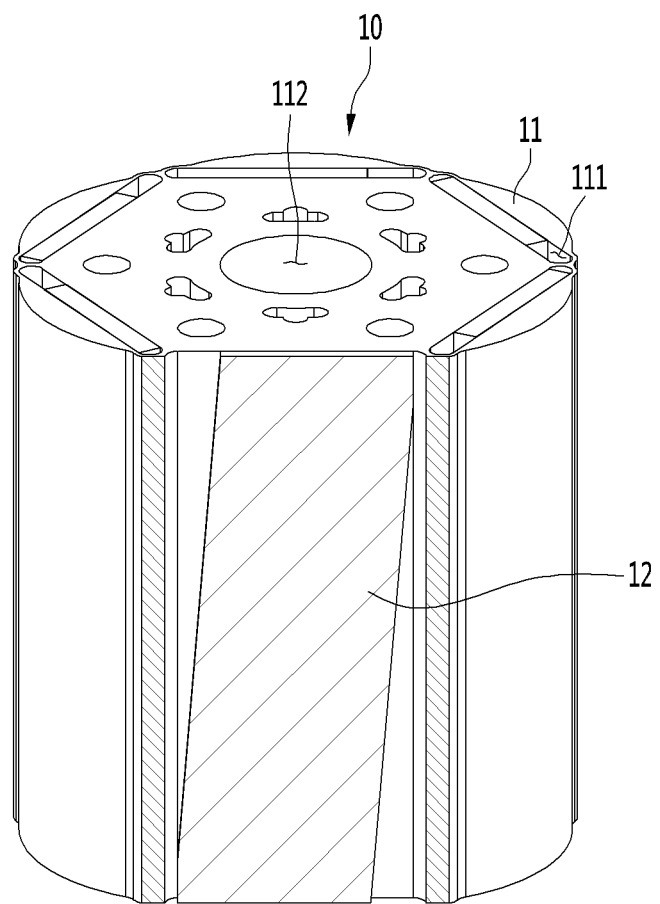
FIG. 2 is a longitudinal sectional cut-out perspective view cut out along line 2-2 of FIG. 1.

FIG. 1 is a perspective view of an interior permanent magnet type rotor according to an embodiment. FIG. 2 is a longitudinal sectional cut-out perspective view cut out along line 2-2 of FIG. 1.

Referring to FIGS. 1 and 2, the interior permanent magnet type rotor 10 according to the embodiment may include a rotor core 11 having a plurality of slots 111 formed therein, and a plurality of permanent magnets 12 inserted into the slots 111.

In detail, a shaft insertion hole 112 is formed at the center of the rotor core 11, and the shaft insertion hole 112 and the rotor core 11 rotate as one body. In addition, a stator (not shown) is installed at the outside of the rotor 10, and the rotor rotates inside the stator when current is supplied to the stator.

The rotor core 11 is formed by stacking a plurality of core plates to a predetermined height. In addition, a hole forming the slot 111 is formed in each of the plurality of core plates, and the slot 111 has a predetermined length in the top-bottom direction as the plurality of core plates are stacked to the predetermined height.

The plurality of slots 111 may be disposed in the circumferential direction of the rotor core 11, and cross-sections of the plurality of slots 111 may have the shape of a linear long hole. In detail, as the plurality of slots 111 are disposed to be spaced apart from each other in the circumferential direction of the rotor core 11, a line connecting the plurality of slots 111 may form a polygonal shape. In addition, the plurality of slots 111 may be formed at positions spaced apart from the center of the shaft insertion hole 112 at a predetermined distance in the radial direction.

Meanwhile, the slot 111 may be formed in a rectangular cross-sectional and longitudinal sectional shape having a predetermined width, a predetermined length, and a predetermined thickness. In addition, the permanent magnet 12 may have a thickness and a length, which correspond to those of the slot 111.

In detail, the slot 111 is a space into which the permanent magnet 12 is inserted. The slot 111 includes a front surface, a rear surface, a left side surface, and a right side surface, and a top surface and a bottom surface may be opened. In addition, a width of the left side surface and the right side surface of the slot 111 is defined as a thickness, and corresponds to the thickness of the permanent magnet 12.

Here, the front surface of the slot 111 may be defined as a surface closest to the shaft insertion hole 112, and the rear surface of the slot 111 may be defined as a surface opposite to the front surface.

The permanent magnet 12 has a rectangular cross-sectional shape, but has a longitudinal section formed in another shape instead of the rectangular shape.

In detail, the section of the permanent magnet 12 has a shape asymmetric with respect to horizontal and vertical lines passing through the center of the permanent magnet 12. The shape of the permanent magnet 12 will be described in more detail below with reference to the accompanying drawings.

Figure 3:
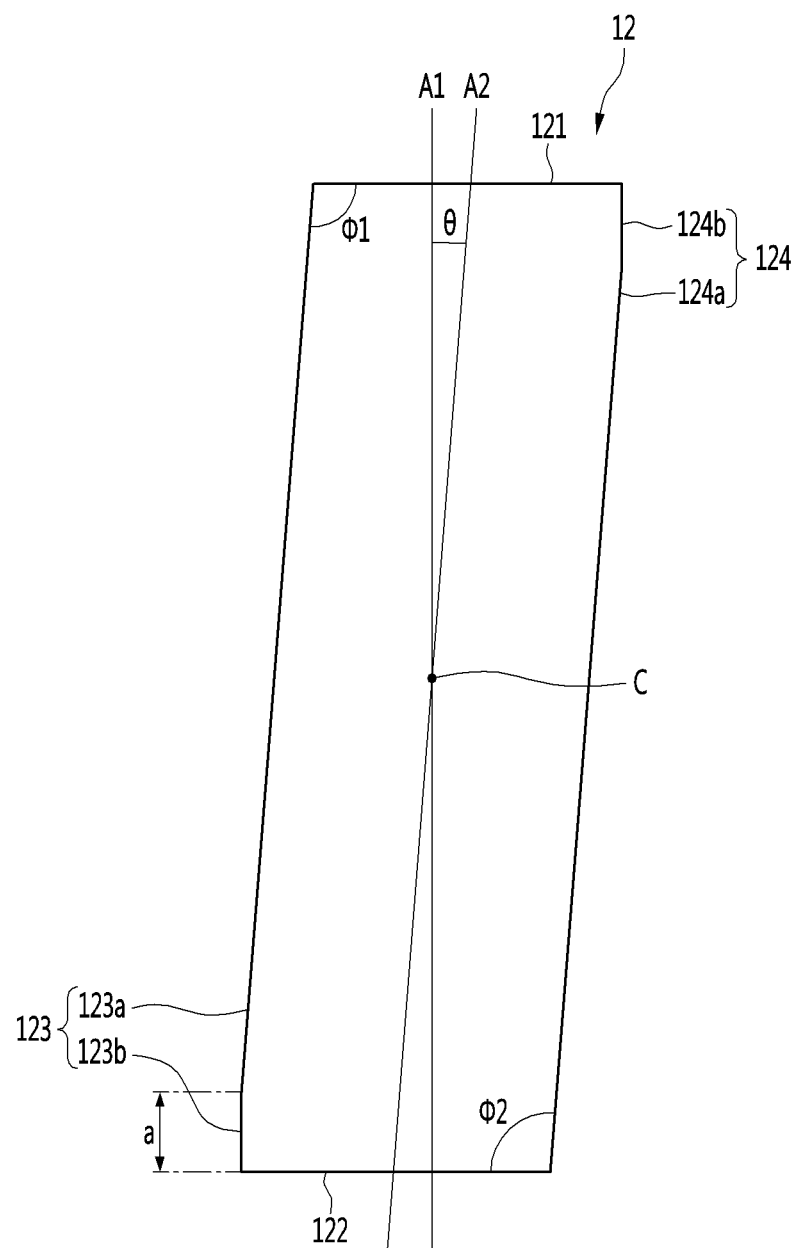
FIG. 3 is a front view of a permanent magnet inserted into a rotor core according to a first embodiment.

FIG. 3 is a front view of a permanent magnet inserted into a rotor core according to a first embodiment.

Referring to FIG. 3, the permanent magnet 12 according to the first embodiment has a shape that is not only vertically asymmetric with respect to a horizontal line passing through the central point of the permanent magnet 12 but also laterally asymmetric with respect to a vertical line passing through the central point of the permanent magnet 12.

In detail, the permanent magnet 12 may include a top surface part 121, a bottom surface part 122, a first side surface part 123, and a second side surface part 124. The top surface part 121 and the bottom surface part 122 may be horizontal surfaces parallel to each other.

In addition, the first and second side surface parts 123 and 124 may include inclined parts 123a and 124a and vertical parts 123b and 124b, respectively. In detail, the inclined part 123a or 124a may extend to be obliquely inclined with a predetermined angle at an edge of any one of the top surface part 121 and the bottom surface part 122. In addition, the vertical part 123b or 124b may be a vertical surface connecting an edge of the other of the top surface part 121 and the bottom surface part 122 at an end portion of the inclined part 123a or 124a. Therefore, the vertical parts 123b and 124 may be in surface contact with both side surfaces of the slot 111.

Any one of the inclined parts 123a and 124a may be defined as a first inclined part, and the other of the inclined parts 123a and 124a may be defined as a second inclined part. Any one of the vertical parts 123b and 124b may be defined as a first vertical part, and the other of the vertical parts 123b and 124b may be defined as a second vertical part.

The vertical parts 123b and 124b are adhered closely to both the side surfaces of the slot 111, to prevent the permanent magnet 12 from shaking in the lateral direction. In addition, the vertical parts 123b and 124b enable the permanent magnet 12 to be smoothly inserted into the slot 111. If the vertical parts 123b and 124 do not exist, the permanent magnet 12 may be damaged while the permanent magnet 12 is dropping in a state in which a corner portion of the permanent magnet 12 is in contact with a side surface of the slot 111. However, as the vertical parts 123b and 124b are formed, damage of the corner portion of the permanent magnet 12 can be minimized while the permanent magnet 12 is being inserted into the slot 111.

In addition, a length a of the vertical parts 123b or 124b may be formed smaller than the length (or height) of the permanent magnet 12, and be a minimum of 0.5 mm or more. When the length of the vertical part 123b or 124b is less than 0.5 mm, it is highly likely that a corner of the permanent magnet 12 will be damaged by a force in the lateral direction, and it is highly likely that the permanent magnet 12 will not be supported without shaking.

In addition, the length of the vertical part 123b formed in the first side surface part 123 of the permanent magnet 12 and the length of the vertical part 124b formed in the second side surface part 124 of the permanent magnet 12 may be equal to each other, but be designed different from each other.

When the lengths of the vertical parts 123b and 124b are designed different from each other, a gradient of the first inclined part 123a and a gradient of the second inclined part 124a may be different from each other. In other words, an angle φ1 formed by the top surface part 121 and the inclined part 123a of the first side surface part 123 and an angle φ12 formed by the bottom surface part 122 and the inclined part 124a of the second side surface part 124 may be set equal to each other, but be set different from each other.

In other words, an angle formed by the inclined part 123a and the vertical part 123b of the first side surface part 123 may be set different from that formed by the inclined part 124a and the vertical part 124b of the second side surface part 124.

However, although the lengths of the vertical parts and/or the gradients of the inclined parts are set different from each other, a distance in the horizontal direction between a vertical line passing through the first vertical part and a vertical line passing through the second vertical part is to maintain a length corresponding to the width of the slot 111.

Meanwhile, an angle θ formed by a central axis A1 of the rotor core 11 and a central axis A2 of the permanent magnet 12 may be defined as a skew angle, and the skew angle may be set in a range of 3 degrees to 45 degrees. In detail, it has been confirmed through an experiment that the skew angle is a critical angle of 30 degrees at which cogging torque is minimized when six poles exist, and is a critical angle of 45 degrees at which the cogging torque is minimized when four poles exist.

Here, the central axis of the permanent magnet 12 is defined as a straight line connecting the center of gravity of upper 50% of the permanent magnet 12 to the center of gravity of lower 50% of the permanent magnet 12. In addition, a point at which the central axis A1 of the rotor core 11 and the central axis A2 of the permanent magnet 12 meet each other may be defined as a central point C of the permanent magnet 12.

Figure 4:
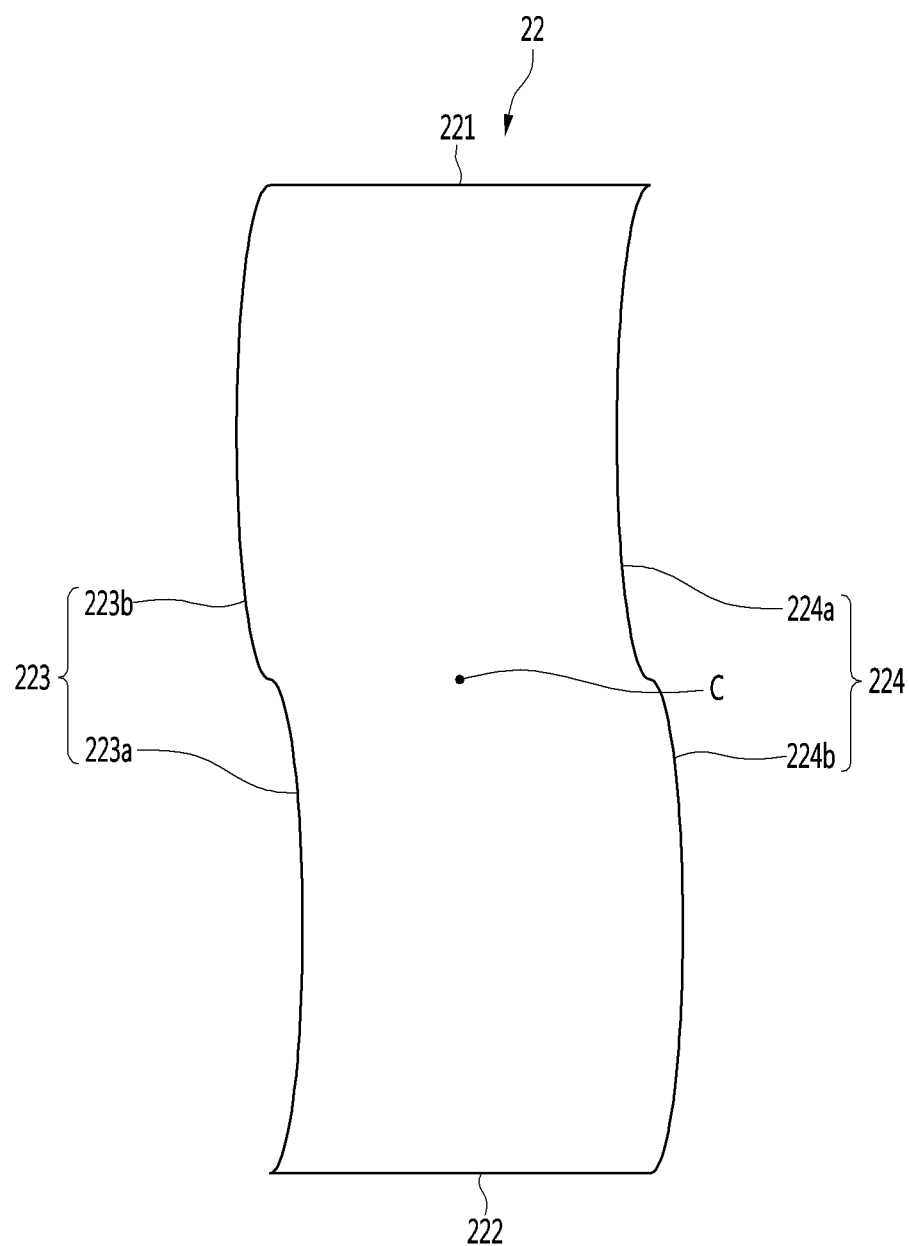
FIG. 4 is a front view of a permanent magnet according to a second embodiment.

FIG. 4 is a front view of a permanent magnet according to a second embodiment.

Referring to FIG. 4, the permanent magnet 22 according to the second embodiment may include a top surface part 221, a bottom surface part 222, a first side surface part 223, and a second side surface part 224.

Like the permanent magnet 12 according to the first embodiment, the permanent magnet 22 according to the second embodiment has a shape asymmetric with respect to horizontal and vertical lines passing through a central point C of the permanent magnet 22. However, the permanent magnet 22 according to the second embodiment is different from the permanent magnet 12 according to the first embodiment in that the first and second side surface parts 223 and 224 are not formed in the shape of a vertical surface but formed in the shape of a curved surface.

In detail, the first and second side surface parts 223 and 224 may include concave parts 223a and 224a concavely rounded toward the inside of the permanent magnet 22, and convex parts 223b and 224b convexly rounded toward the outside of the permanent magnet 22, respectively. In addition, an end portion of the concave part 223a or 224a and an end portion of the convex part 223b or 224b are consecutively connected.

Specifically, one end of the concave part 223a or 224a extends from any one of the top surface part 221 and the bottom surface part 222, and the convex part 223b or 224b connects the other end of the concave part 223a or 224a to the other of the top surface part 221 and the bottom part 222.

In addition, a length between the top and bottom ends of the concave part 223a or 224a and a length between the top and bottom ends of the convex part 223b or 224b may be equal to each other, but be formed different from each other.

In addition, a length of the concave part 223a or the convex part 223b, which is formed in the first side surface part 223, and a length of the concave part 224a or the convex part 224b, which is formed in the second side surface part 224, may be set equal to each other, but be set different from each other.

In addition, a vertical part may be formed with a predetermined length at any portion of the convex part 223b or 224b.

In addition, a curvature of the concave part 223a or 224a and a curvature of the convex part 223b or 224b may be set equal to each other, but be set different from each other.

Figure 5:
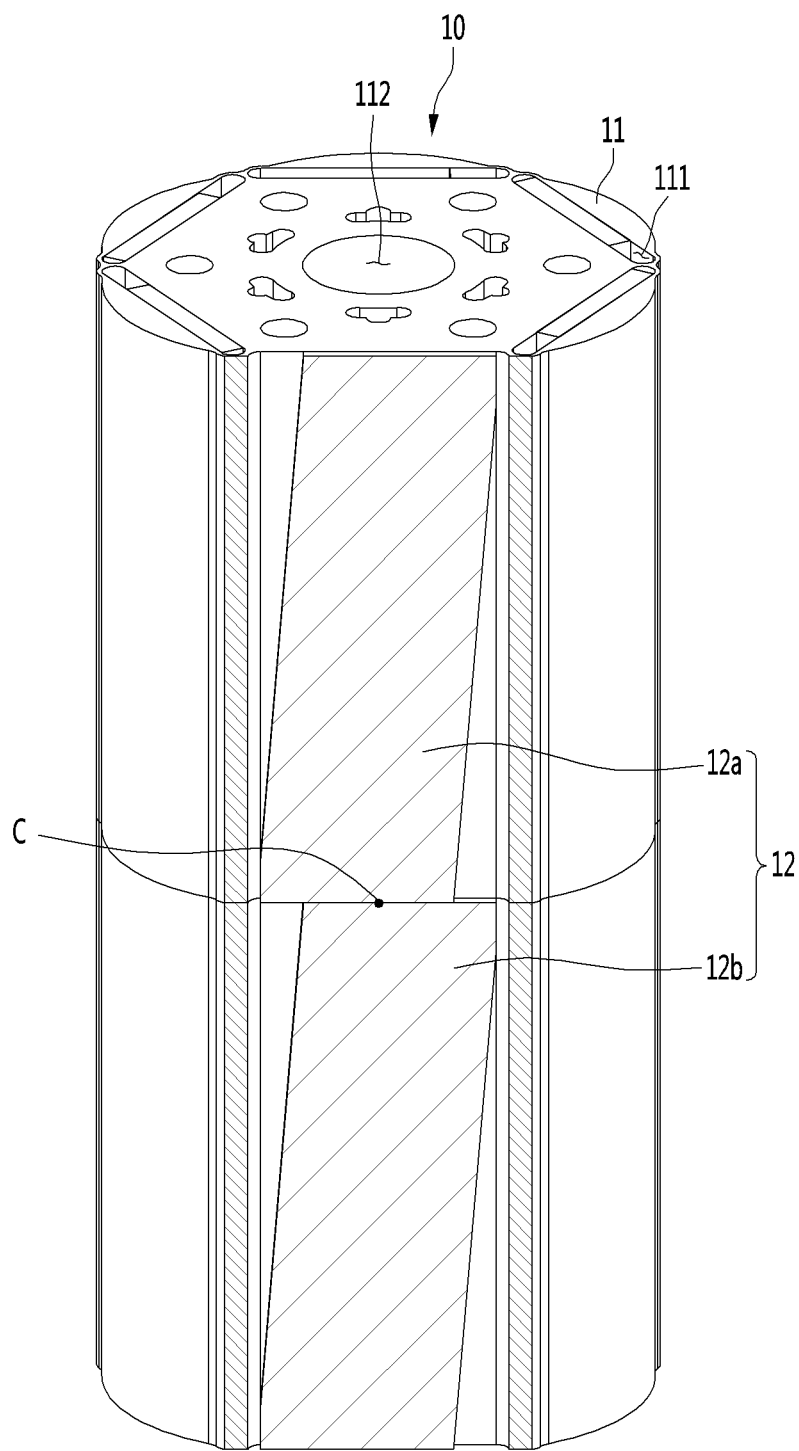
FIG. 5 is a cut-out perspective view of an interior permanent magnet type rotor cut out along line 2-2 of FIG. 1 according to another embodiment.

FIG. 5 is a cut-out perspective view of an interior permanent magnet type rotor cut out along line 2-2 of FIG. 1 according to another embodiment.

Referring to FIG. 5, a length of the rotor 10 may be changed depending on the capacity of a motor, and the shape of a permanent magnet 12 inserted into a slot 111 may be differently formed as the length of the rotor 10 becomes longer.

In this case, this embodiment is identical to the previous embodiment in that the permanent magnet 12 has a shape asymmetric with respect to vertical and horizontal axes passing through the central point of the permanent magnet 12. However, as shown in the drawing, two or more permanent magnets according to the previous embodiment may be inserted into the slot 111.

That is, the permanent magnet 12 according to this embodiment may include a first part 12a at an upper portion thereof and a second part 12b at a lower portion thereof. The first part 12a and the second part 12b may be members separate from each other, or be formed as a single body.

As described above, the permanent magnet inserted into the slot has an asymmetric shape, so that cogging torque and total harmonic distortion (THD) are remarkably reduced.

Also, as the longitudinal section of the slot having the permanent magnet inserted thereinto is formed in a symmetrical rectangular shape, it is unnecessary to stack a plurality of core plates to be each dislocated by a predetermined angle with respect to the vertical axis, so that manufacturing time and cost can be reduced.

In addition, both side surface parts of the permanent magnet inserted into the slot are configured with a combination of vertical and inclined parts or vertical and curved parts, or are configured with only a curved part, so that the permanent magnet does not shake in the left-right direction in the slot.

Although some embodiments of the present disclosure are described for illustrative purposes, it will be apparent to those skilled in the art that various modifications and changes can be made thereto within the scope of the disclosure without departing from the essential features of the disclosure.

Accordingly, the aforementioned embodiments should be construed not to limit the technical spirit of the present disclosure but to be provided for illustrative purposes so that those skilled in the art can fully understand the spirit of the present disclosure.

The scope of the present disclosure should not be limited to the aforementioned embodiments but defined by appended claims. The technical spirit within the scope substantially identical with the scope of the present disclosure will be considered to fall in the scope of the present disclosure defined by the appended claims.

What is claimed is:

1. An interior permanent magnet type rotor comprising:
    a rotor core having a plurality of slots formed therein, the plurality of slots having a symmetric longitudinal sectional shape; and
    a plurality of permanent magnets respectively inserted into the plurality of slots, each of the plurality of permanent magnets having an asymmetric longitudinal sectional shape,
    wherein each of the plurality of permanent magnets includes:
    a top surface part;
    a bottom surface part;
    a first side surface part connecting one end of each of the top surface part and the bottom surface part; and
    a second side surface part facing the first side surface part and connecting the other end of each of the top surface part and the bottom surface part,
    wherein each of the first and second side surface parts of each of the plurality of permanent magnet comprise a concave part and a convex part, the concave part and the convex part being connected to each other.

2. The interior permanent magnet type rotor of claim 1, wherein the asymmetric longitudinal sectional shape comprises a shape that is asymmetric with horizontal and vertical lines passing through a center point of the permanent magnet.

3. The interior permanent magnet type rotor of claim 1, wherein a first inclined part and a second inclined part are formed in the first and second side surface parts, respectively.

4. The interior permanent magnet type rotor of claim 3, wherein the permanent magnet comprises a length and a thickness that correspond to the length and thickness of the slot, and
    wherein a length of a horizontal line connecting a first vertical line passing through the first vertical part and a second vertical line passing through the second vertical part corresponds to a width of the slot.

5. The interior permanent magnet type rotor of claim 4, wherein one of the first vertical part and the second vertical part is longer than the other of the first vertical part and the second vertical part.

6. The interior permanent magnet type rotor of claim 4, wherein a gradient of one of the first inclined part and the second inclined part is greater than that of the other of the first inclined part and the second inclined part.

7. The interior permanent magnet type rotor of claim 1, wherein a central axis of the permanent magnet is defined as a line connecting a center of gravity of a top half of the permanent magnet to a center of gravity of a lower half of the permanent magnet,
    wherein a skew angle ($\theta$) formed by a central axis of the rotor core and the central axis of the permanent magnet is 3 degrees to 45 degrees.

8. The interior permanent magnet type rotor of claim 1, wherein the permanent magnet inserted into the slot comprises a first part and a second part, the first part and the second part being stacked in a top-bottom direction in the slot.

9. The interior permanent magnet type rotor of claim 8, wherein the first part and the second part are separate from each other.

10. The interior permanent magnet type rotor of claim 8, wherein the first part and the second part form an integral body.

11. The interior permanent magnet type rotor of claim 3, wherein a length of the vertical part is greater than or equal to 5 mm.

12. The interior permanent magnet type rotor of claim 1, wherein the first and second vertical parts are respectively formed at the convex parts of the first and second side surface parts.

13. The interior permanent magnet type rotor of claim 1, wherein one of a length of the concave part in the top-bottom direction and a length of the convex part in the top-bottom direction is longer than the other of the length of the concave part in the top-bottom direction and the length of the convex part in the top-bottom direction.

14. The interior permanent magnet type rotor of claim 1, wherein lengths of the concave part and the convex part, which are formed in the first side surface part, are different from those of the concave part and the convex part, which are formed in the second side surface part.

15. The interior permanent magnet type rotor of claim 1, wherein curvatures of the concave part and the convex part, which are formed in the first side surface part, are different from those of the concave part and the convex part, which are formed in the second side surface part.

16. A permanent magnet type motor comprising:
    a stator; and
    an interior permanent magnet type rotor comprising:
        a rotor core having a plurality of slots formed therein, the plurality of slots having a symmetric longitudinal sectional shape; and
        the plurality of permanent magnets claimed in claim 1 and respectively inserted into the plurality of slots,
    wherein the interior permanent magnet type rotor is rotatably disposed inside the stator.

17. A compressor comprising the permanent magnet type motor of claim 16.

* * * * *